United States Patent [19]

Vollmer et al.

[11] 3,792,980

[45] Feb. 19, 1974

[54] REACTOR FOR CARRYING OUT REACTIONS ACCOMPANIED BY A CHANGE IN HEAT

[75] Inventors: Herbert Vollmer; Josef Bomelburg, both of Bottrop; Gunther Kammholz, Geisenkirchenbuer; Oskar Wanka, Deggendorf/Donau; Friedrich Gutlhuber, Ruhmannsefelden, all of Germany

[73] Assignees: VEBA-Chemie AG, Gelsenkirchen-Buer; Deggendorfer Werft Eisenbau GmbH, Deggendorf/Donau, both of, Germany

[22] Filed: Aug. 27, 1971

[21] Appl. No.: 175,523

Related U.S. Application Data

[63] Continuation-in-part of Ser. No. 111,348, Feb. 1, 1971, abandoned.

[52] U.S. Cl............ 23/288 L, 23/288 R, 23/288 M, 165/158, 165/159
[51] Int. Cl................................................ B01j 9/04
[58] Field of Search.......... 23/288 L, 288 R, 288 M; 165/158, 159, 160, 161

[56] References Cited

UNITED STATES PATENTS

| 3,434,807 | 3/1969 | Ibing et al. | 23/288 R |
| 3,285,713 | 11/1966 | Poehler et al. | 23/288 R |
| 3,566,961 | 3/1971 | Lorenz et al. | 165/159 |
| 3,043,651 | 7/1962 | Pietzsch | 23/288 M X |

*Primary Examiner*—James H. Tayman, Jr.
*Attorney, Agent, or Firm*—Ralph D. Dinklage

[57] ABSTRACT

A shell and tube reactor for reactions accompanied by a change in heat. Reaction material flows through the tubes and a heat exchange medium flow through the shell to remove or supply heat of the reaction. Also a pump disposed in the reactor on the shell side circulates the heat exchange medium within the shell. The tubes are disposed in spaced sectors so that passageways are provided for the circulating heat exchange medium. Heat exchange medium is withdrawn and supplied to the shell and is itself subjected to heat exchange outside the reactor. Improved distribution of the heat exchange medium within the shell is obtained by withdrawing and supplying the heat exchange medium, respectively, from and to the aforesaid passageways.

5 Claims, 3 Drawing Figures

FIG. I.

INVENTORS
HERBERT VOLLMER
JOSEF BOMELBURG
GUNTHER KAMMHOLZ
OSKAR WANKA
FRIEDRICH GUTLHUBER
BY
BURGESS, DINKLAGE & SPRUNG
ATTORNEYS.

INVENTORS
HERBERT VOLLMER
JOSEF BOMELBURG
GUNTHER KAMMHOLZ
OSKAR WANKA
FRIEDRICH GUTLHUBER
BY
BURGESS, DINKLAGE & SPRUNG

ATTORNEYS.

REACTOR FOR CARRYING OUT REACTIONS ACCOMPANIED BY A CHANGE IN HEAT

This application is a continuation-in-part of Ser. No. 111,348, filed Feb. 1, 1971, now abandoned.

BACKGROUND

The invention relates to a reactor for carrying out catalytic reactions, in which the catalyst is housed in a plurality of pipes around which flows a heat exchange medium and which are divided into several sectors by means of radial, pipe-free passages designed to circulate the heat exchange medium. A heat exchanger disposed outside the reactor is provided for removing or supplying heat for the reaction.

A reactor for carrying out exothermic reactions is known which is connected with a cooling unit by inlet and outlet pipes for the cooling liquid. With respect thereto, the liquid heated by absorbing the heat from the reaction pipes, reaches the cooler by way of a conduit disposed in the upper section of the furnace and attached to its wall, while the liquid cooled to the necessary degree reenters the lower part of the furnace by way of several conduits. The latter conduits discharge in preferably even distribution at different points of the furnace circumference whereby, if desired, baffle plates are mounted at these points extending into the furnace and leading to the center of the furnace in the form of tunnels. For these baffle plates, which are designed to evenly distribute the cooling liquid, accordingly dimensioned, pipe-free, radial passages are arranged in the furnace otherwise entirely provided with pipes.

A furnace (U.S. Pat. No. 3,434,807) similar to the above-described furnace for carrying out catalytic reactions has become known which differs from the one aforementioned both by the mechanical circulating device arranged in known fashion in the center pipe and the connection of the heat exchanger also placed outside the furnace with the center pipe by only one conduit each for the supply and the removal of the partial stream to be cooled and heated respectively. The selection of short connecting conduits under certain circumstances permits jointly insulating the furnace and heat exchanger vessel making them one structural unit. If the reaction to be carried out in such a furnace is of exothermic nature the heat exchange medium is supplied to the upper part of the upright conduit pipe by way of a pipe from the cooler. The circulating device arranged in the conduit pipe pumps the heat exchange medium under the lowermost of several distributor plates disposed in the furnace. From there the heat exchange medium is evenly distributed over the entire furnace cross-section mainly via the pipe-free passages as well as the lowermost orifice plate. The heat exchange medium flows in upward direction washing around the pipes arranged in the furnace and, after passing through the upper orifice plate, it re-enters the conduit pipe at the top.

A small portion of the heat exchange medium is recycled to the cooler each time after leaving the lower outlet of the conduit pipe via a horizontally disposed pipe. The recycle quantity is adjustable by a throttle valve arranged in the pipe and controlled by the temperature of the heat exchange medium.

THE INVENTION

It has been found that, if the heat exchange medium is supplied according to the practice with known reactors, the uniformity of distribution is not satisfactory. This applied in particular if the reactor diameter is large. For various reasons it is not possible to increase the number of the pipefree passages to the extent in which the reactor diameter increases.

The object of the instant invention is to improve uniformity of distribution in the furnaces, particularly in furnaces of large internal diameter, e.g., diameters of 3 to 7 m. and having, e.g., 4–8 passageways.

According to the invention this problem is solved by arranging, outside the jacket of the reactor, ring conduits for the interflow of the heat exchange medium between the heat exchanger and the reactor. The ring conduits are connected to all of the pipe-free passages.

Pairs of vertical walls are mounted in the reactor at intervals, and define passageways which are each divided into a suction and a pressure zone by a horizontally disposed partition wall. According to the invention a conduit pipe arranged axially in the reactor communicates the suction and pressure zones.

The division into a suction and a pressure zone may be achieved by a single horizontally disposed partition wall in each passageway. However, the division may also be brought about advantageously by means of several partition walls arranged inside each passageway according to hydrodynamic principles.

An embodiment of the invention is illustrated in the drawings, illustrating a reactor for carrying out an exothermic reaction. In the drawings.

Figure 1:
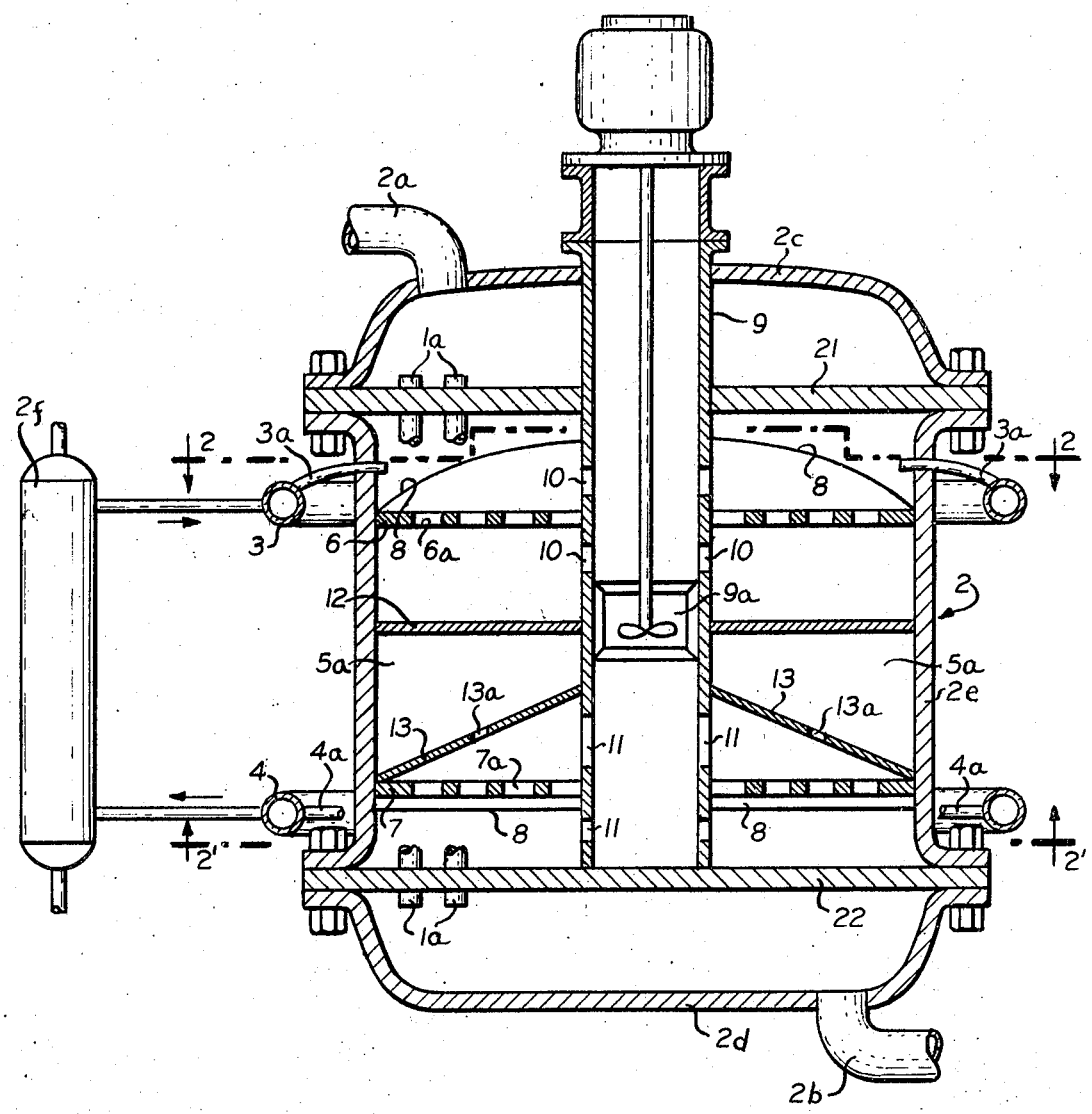
FIG. 1 is a cross-sectional, elevation view of a reactor according to the invention.

The invention provides apparatus suitable for reactions accompanied by a change in heat. The apparatus comprises a shell and tube reactor having a shell body portion, a tube sheet and a header mounted on each end of the body portion, and tubes mounted in the tube sheets for receiving and discharging reaction material, respectively, from and to the headers. Circulating means between the tube sheets are provided for circulating heat exchange medium on the shell side. The tubes are disposed in spaced sectors defining tube free passageways communicating with the circulating means, for distribution of the heat exchange medium on the shell side. Also provided are heat exchange medium inlet conduit means for introduction of heat exchange medium to the shell side of the reactor, and heat exchange medium outlet to conduit means for withdrawal of heat exchange medium from the shell side of the reactor. The invention provides the improvement in such equipment, which involves said inlet and outlet conduit means, respectively, including conduits communicating with each of said passageways. Thereby distribution of heat exchange medium in the shell is improved so that the heat transfer is better.

Desirably, partitions are disposed between the tube sheets on the shell side defining said passageways and separating the passageways from the tubes, so as to adapt the passageways for receiving and discharging heat exchange medium adjacent the tube sheets for circulating of the heat exchange medium into, through, and out of the passageways and over the tubes and return to the passageways. The circulating means can include a pump disposed between the tube sheets, and means communicating the suction side and pressure side of the pump with said passageways for pumping of heat exchange medium through the passageways. A partition can be disposed in each passageway dividing it into a suction part and a pressure part.

The reactor is composed of a shell 2 having inlet 2a and outlet 2b, and outfitted with tube sheets 21 and 22, in which the tubes 1a are mounted in the usual manner. The tube sheets 21 and 22 are clamped between the shell body portion 2e and the headers 2c and 2d.

The shell side of the exchanger, i.e., the portion of the exchanger outside the tubes 1a and between the tube sheets 21 and 22, is provided with a special construction for improved circulation of the fluid used for effecting the heat exchange.

Figure 2:
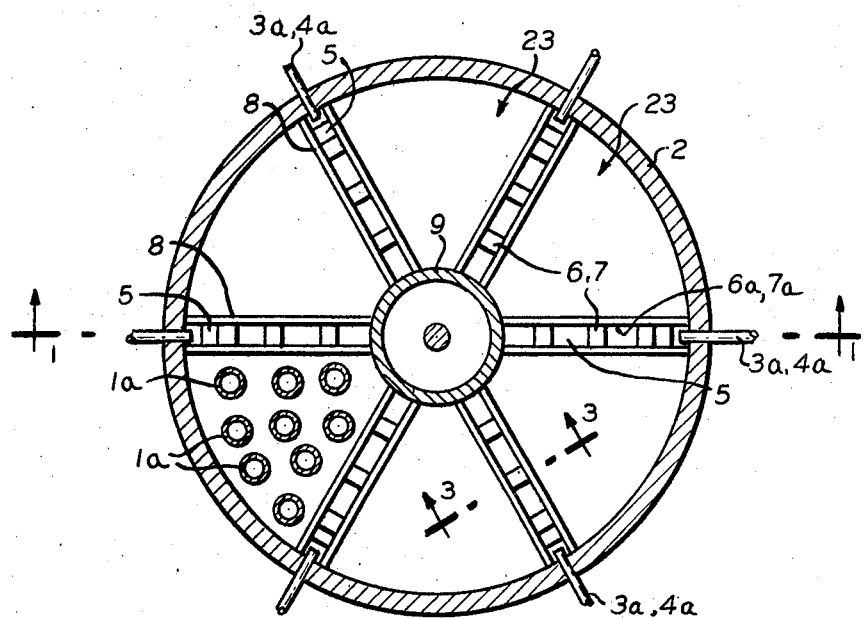
FIG. 2 is taken along line 2—2, or along line 2'—2' in FIG. 1.

Referring to FIG. 2, and considering that view to be top cross-section view along line 2—2 in FIG. 1 (the same drawing applies to a bottom view taken along line 2'—2' in FIG. 1), the shell side is divided into a number of sectors 23 by the vertically extending passageways 5, which are defined by the vertically extending walls 8. A plurality of tubes 1a, which can be filled with catalyst, passes through each sector.

Each passageway 5 is provided with an upper distributor plate 6 and a lower distributor plate 7. The upper distributor plate 6 is disposed adjacent the upper edges of walls 8 which edges are inclined upwardly in the inward direction. Also, the upper distributor plate 6 is provided with perforations 6a and the lower distributor plate 7 is provided with perforation 7a.

Figure 3:
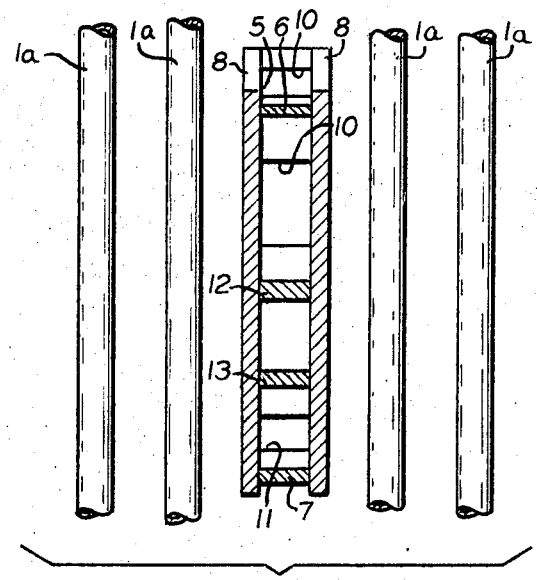
FIG. 3 is taken along line 3—3 in FIG. 2.

Each of the passageways 5 is provided with a partition 12 (FIG. 3) which divides it into an upper portion and a lower portion. The walls 8 which define the passageway 5 extend to above the upper distributor plate 6, and to below the lower distributor plate 7.

A conduit 9 is mounted in the reactor, coaxially therewith and a pump 9a is mounted within the conduit.

The pump 9a circulates the heat exchange medium in the shell side, as will be explained in detail hereinafter. During the circulation, a portion of the circulating stream is withdrawn via outlets 4a, into outlet ring conduit 4, and passes from ring conduit 4 to a heat exchanger 2f for removal or addition of heat as the operation may require, and is then introduced into the ring conduit 3, which is provided with inlets 3a for transfer of the fluid from the ring conduit to within the shell. The inlets 3a are positioned so that the incoming fluid can flow from the inlets 3a into passageways 5. Similarly outlets 4a are arranged to receive fluid from passageways 5.

In operation, fluid in the passageways 5, above the partitions 12, is drawn by pump 9a through openings 10, into the conduit 9. The pump 9a drives the fluid downwardly in the conduit 9. Below the pump 9a, the conduit 9 is provided with outlet openings 11 which communicate the inside of the conduit 9 with the lower portion of the passageways 5, i.e., that part of the passageways 5 below the partitions 12. Fluid passing into the lower portion of the passageways 5 moves downwardly in those passageways to the lower end thereof, there leaving the passageways, and then passing into the sectors 23 (FIG. 2). The fluid then passes upwardly through the segments 23, in indirect heat exchange relation with the material passing through the tubes 1a. The fluid then overflows the top of the walls 8 defining the passageways 5, and passes into the upper portion of the passageways 5, i.e., that portion of the passageways 5 above the partitions 12. As described above, the fluid in the upper portion of the passageways 5 is drawn by the pump. Thus, the heat exchange fluid is circulated through the shell side of the reactor.

In the embodiment shown, to improve distribution of the heat exchange fluid, the lower portion of each of the passageways 5 is provided with an inclined baffle 13 which aid in distributing the heat exchange fluid radially, in a preferred manner. This leaves dead spaces 5a (FIG. 1) in the lower portion of the passageways 5, defined by the walls 8 and partitions 12 and the inclined baffles 13. To vent the dead spaces in the passageways 5, vents 13a are provided to communicate the dead space with the space below the inclined baffles 13.

The mixing of the relatively small portion (5 percent to 10 percent or 20 percent) of the colder cooling medium supplied by exchanger 2A with each of the circulating streams inside the upper passages 5 is of special importance since then less streaks of varying temperature occur in the stream in conduit 9 than in prior art apparatus wherein a single conduit is used to deliver the cold fluid to the reactor.

In order to provide a particularly uniform inflow of the heat exchange medium from the pipe-areas into the passages 5 the side walls 8 of the passages above the distributor plate 6 may rise going from the reactor periphery towards the center.

Except as is indicated above the operation is as in the case of the above-referred to the prior art reactors.

The embodiment illustrated in the drawing is but one form for a reactor according to the invention.

What is claimed is:

1. An apparatus suitable for reactions accompanied by a change in heat comprising:
   a. a shell and tube reactor having a shell body portion, a tube sheet and a header mounted on each end of the body portion, and tubes mounted in the tube sheets for receiving and discharging reaction material, respectively, from and to the headers, a pipe disposed axially between the tube sheets and having circulating means disposed therein for circulating heat exchange medium on the shell side between the tube sheets, the tubes being disposed in spaced sectors defining tube free passageways communicating with the circulating means, for distribution of the heat exchange medium on the shell side,
   b. heat exchange medium inlet conduit means for introduction of heat exchange medium to the shell side of the reactor and heat exchange medium outlet conduit means for withdrawal of heat exchange medium from the shell of the reactor,
   the improvement for providing better distribution of the heat exchange medium, which comprises
   c. a pair of spaced, vertically extending walls disposed between the tube sheets on the shell side defining each of said passageways, a horizontally extending partition wall in each passageway dividing each passageway into an upper section and a lower section, openings in said axially disposed pipe communicating said upper and lower sections of the passageways with the suction side and pressure side of the circulating means, said inlet conduit mean
   d. said inlet and outlet conduit means each comprising a ring conduit disposed without and about the reactor, pipes communicating one of the ring conduits with the upper end of each of said passageways adjacent the periphery of the shell, and pipes communicating the other of the ring conduits with the lower end of each passageway adjacent the periphery of the shell.

2. Apparatus according to claim 1, and a heat exchanger connected to said outlet and inlet conduit means for receiving heat exchange medium, and returning the heat exchange medium used in the reactor.

3. Apparatus according to claim 1, the upper ends of the passageway walls being inclined upwardly in the inward direction, and a distributor plate in the uppper portion of each passageway adjacent the inclined upper end thereof for more uniform flow of heat exchange medium.

4. Apparatus according to claim 3, and a baffle in the lower end of each passageway inclined downwardly in the outward direction for improved distribution of the heat exchange medium.

5. Apparatus according to claim 1, said conduits communicating with the passageways, being the only means for direct introduction and withdrawal of the heat exchange medium, respectively, into and from the shell.

* * * * *

UNITED STATES PATENT OFFICE
CERTIFICATE OF CORRECTION

Patent No. 3,792,980　　　　　　　　Dated February 19, 1974

Inventor(s) Herbert Vollmer et al.

It is certified that error appears in the above-identified patent and that said Letters Patent are hereby corrected as shown below:

The data sheet, add:

--[30] Foreign Application Priority Data
　　February 3, 1970　Germany　P 20 04 774--

Col. 4, line 19, change "2A" to --2f--.

Col. 4, line 65, (claim 1, sub-paragraph c,
　　　last line,) cancel "said inlet conduit mean".

Signed and sealed this 11th day of February 1975.

(SEAL)
Attest:

RUTH C. MASON
Attesting Officer

C. MARSHALL DANN
Commissioner of Patents
and Trademarks